Nov. 29, 1938.  W. C. KEYS  2,138,175
RESILIENT MOUNTING
Filed Oct. 10, 1935  2 Sheets-Sheet 1

INVENTOR.
WALTER C. KEYS
BY Walter L. Pipe
ATTORNEYS.

Nov. 29, 1938.  W. C. KEYS  2,138,175
RESILIENT MOUNTING
Filed Oct. 10, 1935  2 Sheets-Sheet 2

INVENTOR.
WALTER C. KEYS
BY
Walter L. Pipes
ATTORNEY.

Patented Nov. 29, 1938

2,138,175

UNITED STATES PATENT OFFICE 2,138,175

RESILIENT MOUNTING

Walter C. Keys, Detroit, Mich., assignor to United States Rubber Products, Inc., New York, N. Y., a corporation of Delaware Application October 10, 1935, Serial No. 44,354

12 Claims. (Cl. 248—358)

This invention relates to improved resilient mountings or vibration dampeners, and it is particularly useful in providing a mounting for supporting a load the thrust of which is principally downward due to the weight of the load which the mounting supports. In general, the invention consists of a rigid support for attachment to a machine, a rigid support for attachment to a foundation or base, and resilient material embracing a portion of one of said supports and bonded to said rigid supports so as to maintain them in a flexible relation to each other so that vibrations in the direction of the load and laterally thereto may be absorbed.

An object of the invention is to provide an inexpensive medium upon which machinery may be set so as to increase the life, efficiency, and smooth operation of the machine, and to reduce vibrations transmitted from the machine to floor or foundation.

Another object is to provide a mounting which may be employed with new or old machinery, without requiring different anchoring means or requiring special spacing of anchoring bolts.

A further object is to provide a mounting in which the rubber is bonded to the metal in which the rubber acts in shear to support the load, and in compression to oppose movements of the machine perpendicular to the direction of the load.

A still further object is to provide a mounting containing safety means which will operate to secure a machine within definite limits in the event that the bond between the elastic medium and the metal parts is broken or the elastic medium fails to function properly due to excessive overloads imposed upon it.

The invention is illustrated in the accompanying drawings, in which.

Figure 1:
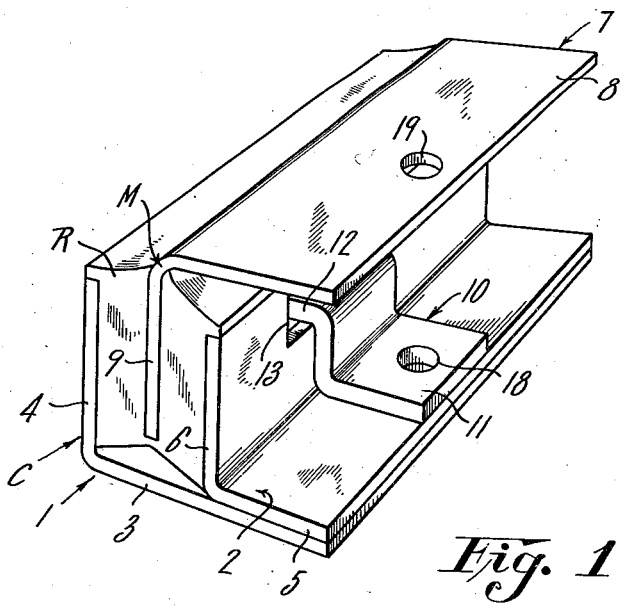
Fig. 1 is a perspective view of a complete mounting embodying this invention.
Figure 2:
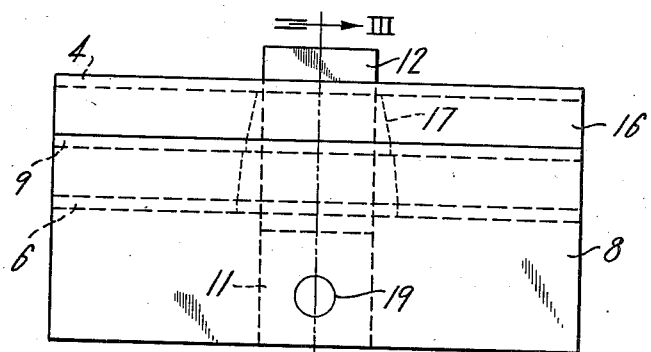
Fig. 2 is a plan view thereof.

Referring to the drawings, the base of the mounting comprises a female or channel member C which embraces a portion of a male member M secured in the channel member C by resilient rubber or rubber-like material R bonded preferably by vulcanization to the sides of the member M and the channel member C. The channel member C is adapted to be secured to a body such as a foundation for a machine, and the male member M is adapted to be secured to a vibrating body such as a machine. The vibrations between the bodies are absorbed by the rubber R which is stressed in shear by the load of the machine.

The channel member C, as illustrated in the drawings, comprises a pair of angle irons 1 and 2, each respectively having base legs 3 and 5. The top base leg 5 is supported on the bottom base leg 3 and the two legs provide a base for the mounting including a lateral extension adapted to be secured to a foundation. The angle irons 1 and 2, respectively, are provided with channel side legs 4 and 6. A channel is formed between the side legs 4 and 6. The male member M comprises an inverted angle iron 7 having a leg 9 extending into the channel, and an overhanging leg 8 extending parallel to the base legs 3 and 5. The resilient rubber-like material embraces the inner leg 9 and is vulcanized thereto and to the channel side legs 4 and 6.

The unit consisting of the various angles bonded together by the rubber may be of any desired length, depending upon the weight of the load which the mounting is intended to support.

As a safety feature of this invention, a lock plate 10 is positioned preferably equidistant along the length of the angle 2. The lock plate 10 comprises a base portion 11 which rests upon the base leg 5 of the angle 2. The lock plate 10 extends upwardly adjacent the side leg 6 of the angle 2, and is bent at a right angle to form a tongue 12 which extends transversely of the channel side legs 6 and 4 and the inner leg 9. In order to accommodate the lock plate 10, a notch or opening 13 is formed in the vertical side leg 6 of the angle 2. A hole or window 14 formed in the inner leg 9 of the inverted angle 7 provides clearance for the tongue 12 of the lock plate 10 so that the inverted angle may have a limited movement parallel to the sides 6 and 4 on the angles 1 and 2, without contacting with the lock plate 10.

The leg 4 of the angle 1 is provided with a slot 15 into which the tongue 12 of the lock plate 10 is slidable. If desirable, this fit between the slot 15 and the tongue 12 may be snug or tight, as its purpose is to form a support for the end of the tongue 12 of the lock plate 10.

Clearance, or a cut-away portion 17 is also provided in the body of the rubber R so that the rubber will not contact with the tongue 12 of the lock plate 10.

Apertures 18 extend in alignment through the base portion 11 of the lock plate 10, and the base legs 5 and 3 of the angles 1 and 2. A similar aperture 19 extends through the overhanging leg 8 of the inverted angle 7. This aperture 19 preferably lies in axial alignment with the apertures 18.

By thus locating the holes or apertures 18 and 19 in alignment, the installation of my mounting becomes simplified. When the mounting is used to support a previously installed machine the bolt which attaches the machine to its foundation may be removed and replaced in the apertures 18 so as to secure the base members of my resilient mounting to the foundation. The machine is then rested upon the overhanging leg 8 of the inverted angle 7, and another bolt may attach this angle to the machine. In this manner, the resilient mounting may be incorporated with old machines without the necessity of boring additional holes or changing the method of attachment to a foundation. It is obvious that the mounting may be used in the same relationship in an initial installation of a machine.

When the machine is supported on the overhanging leg 8, the inner leg 9 of the angle iron 7 tends to move towards the base leg 3 and imposes a shear stress upon the rubber-like material R, that is, the load forces extend parallel to the bond between the rubber and the angle irons. A free space between the bottom of the inner leg 9 and the base leg 3 is provided for the vibrating movement of the leg 9.

Figures 3, 4:
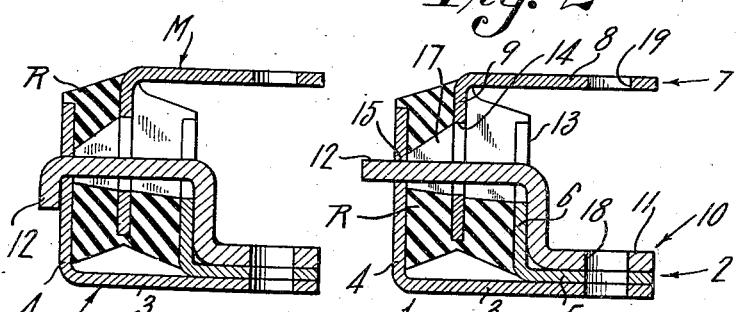
Fig. 3 is a transverse view, in section, taken along lines III—III of Fig. 2.
Fig. 4 is a view similar to Fig. 3 but showing a modification of the invention.

Although the rubber is stressed in shear, it is desirable to position the angles 1 and 2 so as to place the rubber in compression. This may be effected by initially assembling the mounting so that a greater distance exists between the channel sides 4 and 6 than after the final assembly of the mounting. In other words, the apertures 18 in the lock plate 10 and angle 2 may be out of alignment with the aperture 18 in the angle 1, and the act of bringing the apertures into alignment at the final assembly of the mounting will result in bringing the channel sides 4 and 6 closer together to compress the rubber R. If desirable, the rubber R may be placed in compression at the initial assembly operation, and retained in this manner by bending down the end of tongue 12 of the lock plate 10 as shown in Fig. 4.

Figure 5:
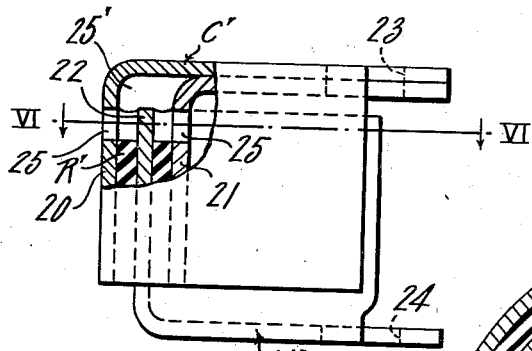
Fig. 5 is a side elevational view, partly in section, of a modified mounting adapted to resist lateral vibration in all directions by subjection of the rubber to compression.
Figure 6:
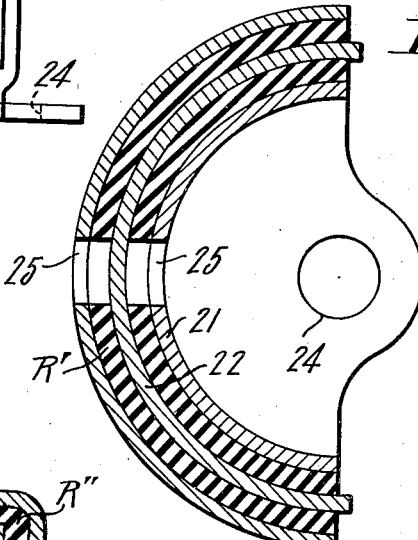
Fig. 6 is a cross-sectional view on line 6—6 of Fig. 5.

The modified mountings in Figs. 5 to 8 provide means for resisting lateral vibration in all directions due to the lateral compression of the rubber between the metal parts. Referring to Figs. 5 and 6, the vertical metal legs 20, 21 and inner leg 22 respectively, extending from the channel member C' and the lower angle member M' are curved so that lateral vibrations along any radius from the securing bolt holes 23, 24 will be resisted by the compression of the rubber R' between the legs 20, 21 and the leg 22. Either the channel member C' or the lower angle member M' may be attached to either the member subject to vibrations or to a foundation by bolts extending through the axially aligned bolt holes 23, 24 in the respective members C' and M'. Holes 25 are formed in the legs 20, 21 of the channel member C' for the insertion of pins (not shown) which are adapted to contact with and maintain the inner leg 22 in spaced relation with the outer legs 20 and 21 during the vulcanization of the rubber R'. A free space 25' is provided above the inner leg 21 so that during the relative vibration of the members M', C' the inner leg 22 may vibrate freely without compressing the rubber R'.

Figure 8:
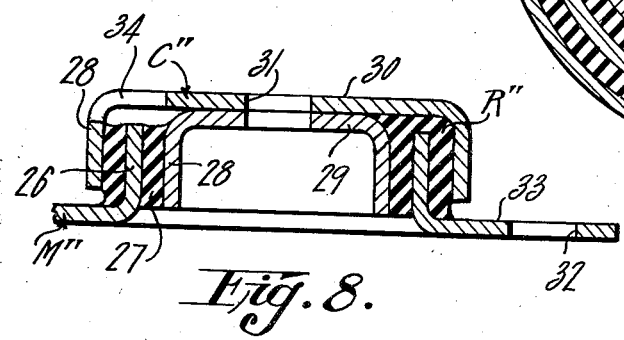
Fig. 8 is a cross-sectional view on line 8—8 of Fig. 7.
Figure 7:
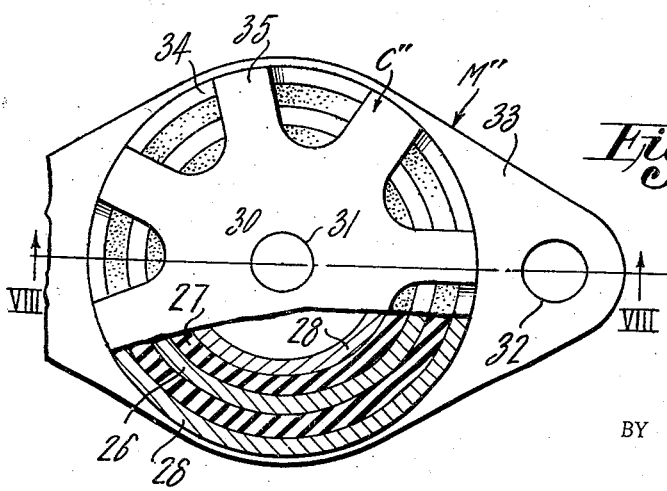
Fig. 7 is a plan view partly in section of a mounting of circular form in which one of the securing flanges is broken away.

The mounting shown in Figs. 7 and 8 comprises an annular channel member C'' and a base member M'' having an annular lip 26 or leg extending into an annular channel 27 formed between walls 28 of an inner cup-shaped metal member 29 and an outer cup-shaped metal member 30. Rubber R'' fills the space between the walls of channel 28 and the lip 26 and is vulcanized to these members. The channel member C'' is provided with a central securing bolt hole 31 and the base member M'' is provided with securing bolt holes 32 in its flanges 33. In this modification it is difficult to provide a free space at the bottom of the channel formed by the legs 28 of the member C''. This difficulty is encountered in view of the impracticability of removing the core from the space above the inner leg 26. However, the compression of the rubber between the inner leg 26 and the bottom of the channel member C'' is reduced by forming openings 34 in the bottom of the channel C''. The only rubber subjected to compression by the relative vibration of the members C'' and M'' is that positioned between the solid portions 35 and the top of the leg 26. This amount of rubber is relatively small and the mounting has substantially the characteristics of a mounting where all of the load is supported by the rubber in shear.

While I have shown and described certain embodiments of the present invention, it is obvious that modifications may be made in the disclosed embodiments without departing from the spirit and scope of the invention. As an example, it should be understood that one or more lock plates may be used and/or the mounting may contain provision for but one or a plurality of anchoring bolts. All such modifications are contemplated as part of the present invention as far as covered by the scope of the appended claims.

Having thus described my invention what I claim and desire to protect by Letters Patent is:

1. A mounting for absorbing vibrations between two bodies comprising, a channel member having channel sides and a lateral extension adapted to cooperate with one body, an embraced member having an inner leg extending into said channel member and an overhanging leg extending angularly from said inner leg over the top of one of said channel sides and substantially parallel with said lateral extension and adapted to cooperate with the other body, and resilient rubber-like material embracing said inner leg and bonded thereto and to the sides of said channel member.

2. A mounting for absorbing vibrations between two bodies comprising a channel member having channel sides and a lateral extension adapted to cooperate with one body, an embraced member having an inner leg extending into said channel member and an overhanging leg extending angularly from said inner leg over the top of one of said channel sides and substantially parallel with said lateral extension and adapted to cooperate with the other body, and resilient rubber-like material embracing said inner leg and bonded thereto and to the sides of said channel member, said lateral extension and said overhanging leg each having holes in axial alignment with one another for attachment to said bodies.

3. A mounting for absorbing vibrations between two bodies comprising a channel member having channel sides and a lateral extension adapted to cooperate with one body, an embraced member having an inner leg extending into said channel member and an overhanging leg extending angularly from said inner leg over the top of one of said channel sides and substantially parallel with said lateral extension and adapted to cooperate with the other body, resilient rubber-like material embracing said inner leg and bonded thereto and to the sides of said channel member, and a locking member extending through at least one of said channel sides and said inner leg.

4. A mounting for absorbing vibrations between two bodies comprising a channel member having channel sides and a lateral extension adapted to be attached to one body, an embraced member having an inner leg extending into said channel member and an overhanging leg extending angularly from said inner leg over the top of said channel sides and substantially parallel with said lateral extension and adapted to be attached to the other body, resilient rubber-like material embracing said inner leg and bonded therto and to the sides of said channel member, said lateral extension and said overhanging leg each having holes in axial alignment with one another, and a locking member extending through at least one of said channel sides and said inner leg.

5. A mounting for absorbing vibrations between two bodies comprising a channel member adapted to be attached to one of said bodies, a member having a portion extending into said channel member and adapted to be attached to the other body, resilient rubber-like material embracing said portion and bonded thereto and to the sides of said channel, and a locking member extending through apertures in the sides of said channel member and said portion embraced by said rubber-like material, said aperture in said embraced portion being larger than said locking member.

6. A mounting for absorbing vibration between two bodies comprising a channel member adapted to be attached to one of said bodies, a member adapted to be attached to the other body, said member having a leg extending into said channel member, said leg being provided with an aperture, resilient rubber-like material embracing said leg, said rubber-like material having a cavity therein coinciding with said aperture, said material being bonded to the sides of said channel and to the said leg extending therein, and a locking member secured to the sides of said channel and extending loosely through said cavity and aperture.

7. A mounting for absorbing vibrations between two bodies comprising a channel member formed of angle irons, each of said angle irons having a base leg and a side leg, said base legs being superposed on one another and said side legs extending parallel to one another and forming a channel therebetween, an angle iron having a leg extending into said channel and a second overhanging leg extending over the top of said channel and parallel to said base legs, resilient rubber-like material embracing said leg within said channel and vulcanized thereto and to said side legs of said channel.

8. A mounting for absorbing vibrations between two bodies comprising a channel member formed of angle irons, each of said angle irons having a base leg and a side leg, said base legs being superposed on one another and said side legs extending parallel to one another and forming a channel therebetween, an angle iron having a leg extending into said channel and a second overhanging leg extending over the top of said channel and parallel to said base legs, resilient rubber-like material embracing said leg within said channel and vulcanized thereto and to said side legs of said channel, said base legs and overhanging leg having aligned holes for attaching said members to the bodies.

9. A mounting for absorbing vibrations between two bodies comprising a channel member formed of angle irons, each of said angle irons having a base leg and a side leg, said base legs being superposed on one another and said side legs extending parallel to one another and forming a channel therebetween, an angle iron having a leg extending into said channel and a second overhanging leg extending over the top of said channel and parallel to said base legs, resilient rubber-like material embracing said leg within said channel and vulcanized thereto and to said side legs of said channel, a locking member having a base portion extending along said base legs and a tongue extending through an aperture in said side leg and through an over-size aperture in said leg embraced by said rubber-like material.

10. A mounting for absorbing vibrations between two bodies comprising a channel member formed of angle irons, each of said angle irons having a base leg and a side leg, said base legs being superposed on another and said side legs extending parallel to one another and forming a channel therebetween, an angle iron having a leg extending into said channel and a second overhanging leg extending over the top of said channel and parallel to said base legs, resilient rubber-like material embracing said leg within said channel and vulcanized thereto and to said side legs of said channel, a locking member having a base portion extending along said base legs and a tongue extending through apertures in said side legs and through an oversize aperture in said leg embraced by said resilient rubber-like material, and means on said tongue for holding said rubber-like material in a compressed condition, said base legs, locking member, and overhanging leg having axially aligned holes for attaching said members to the bodies.

11. A resilient mounting comprising a channel member having a channel formed in its outer periphery between two curved plate legs having their axes of curvature extending in the direction of the load, a second member having a curved plate leg extending into said channel, each of said members having a lateral plate extension lying in planes perpendicular to said axis and adapted to be attached to a supported and supporting body respectively, and rubber interposed between and vulcanized to the curved legs of said members.

12. A resilient mounting comprising a channel member having a channel formed in its outer periphery between two curved plate legs having their axes of curvature extending in the direction of the load, a second member having a curved plate leg extending into said channel, each of said members having a lateral plate extension lying in planes perpendicular to said axis and adapted to be attached to a supported and supporting body respectively, said extension in each member having a securing hole in axial alignment, and rubber interposed between and vulcanized to the curved legs of said members, said channel bottom having a free space between it and said rubber for the curved leg on said second member to vibrate within.

WALTER C. KEYS.